June 2, 1942.  P. F. BOEYE  2,284,942
BOX
Filed Feb. 16, 1940   3 Sheets-Sheet 3
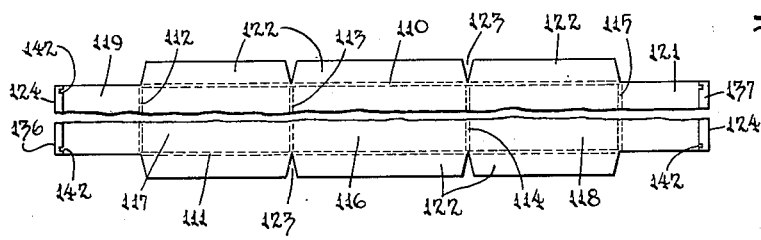
Fig. 10
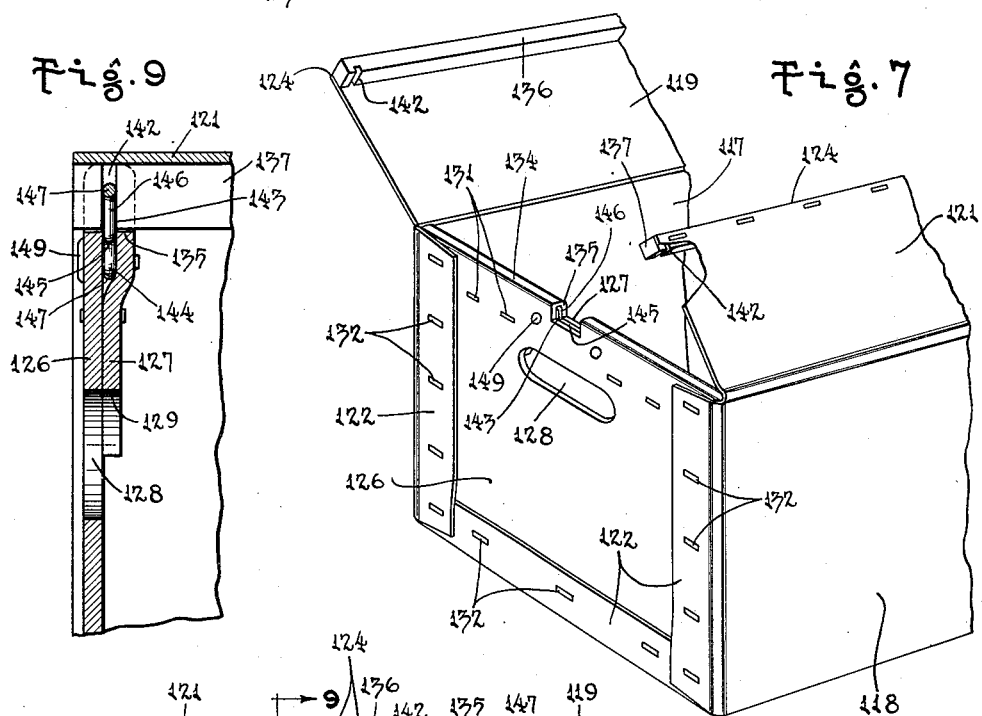
Fig. 9
Fig. 7
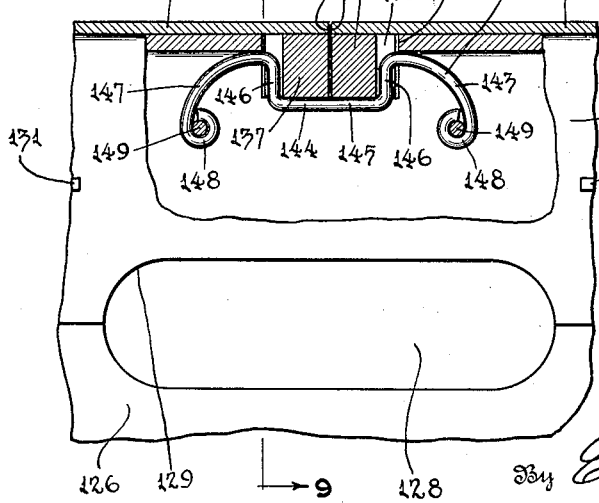
Fig. 8
Inventor
Paul F. Boeye
By Caswell & Lagaard
Attorneys Patented June 2, 1942

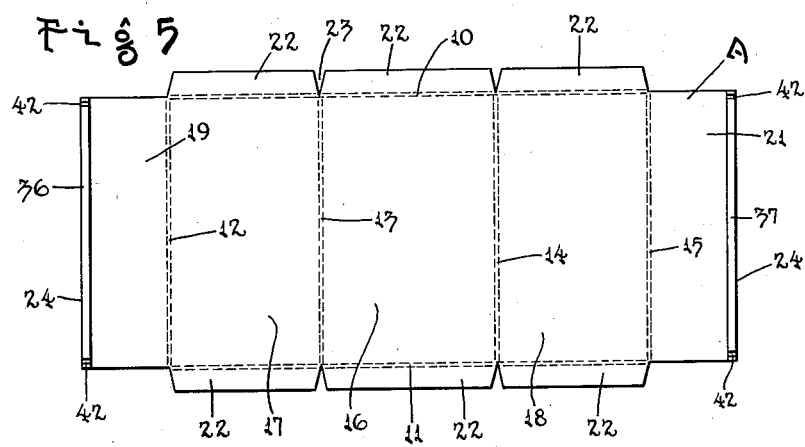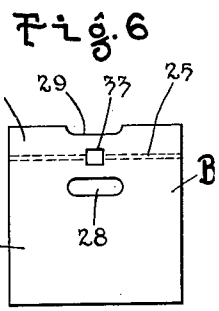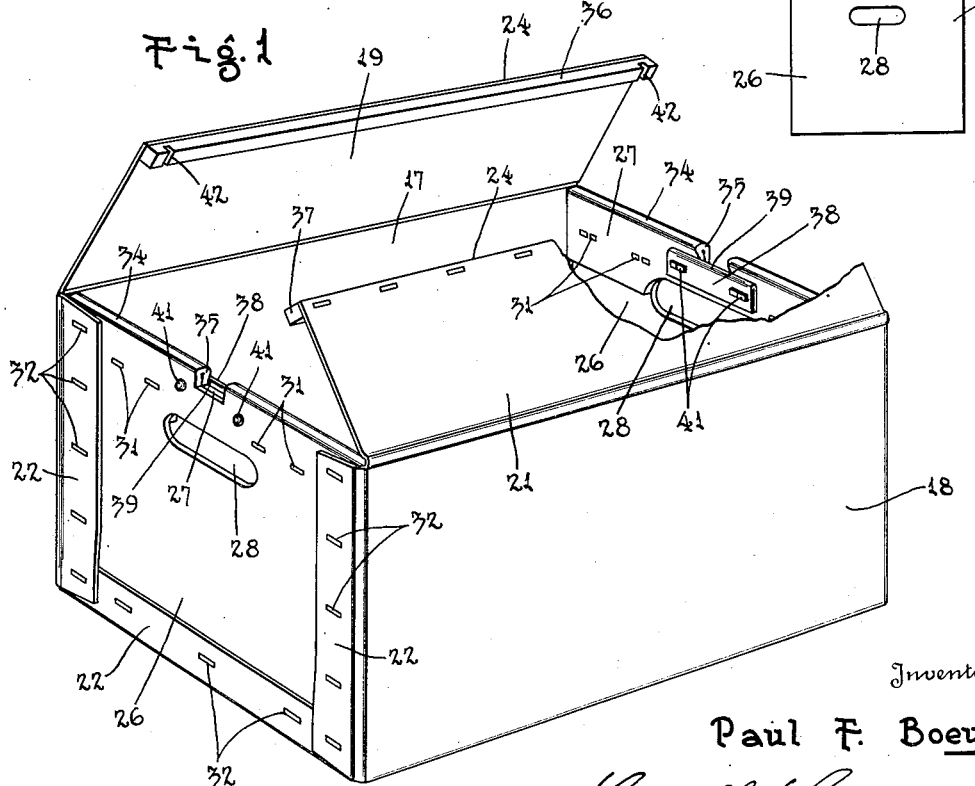

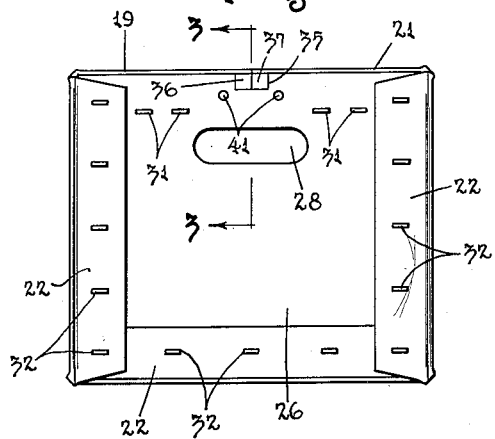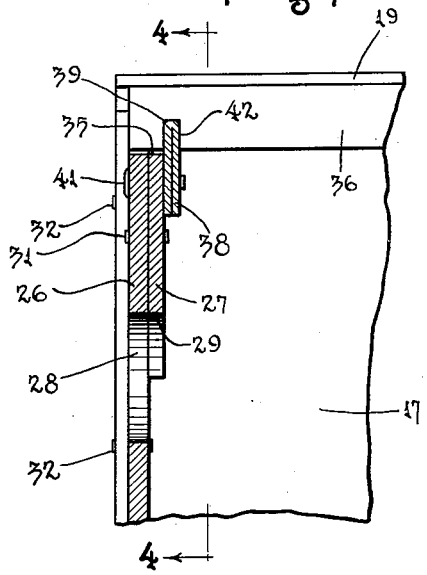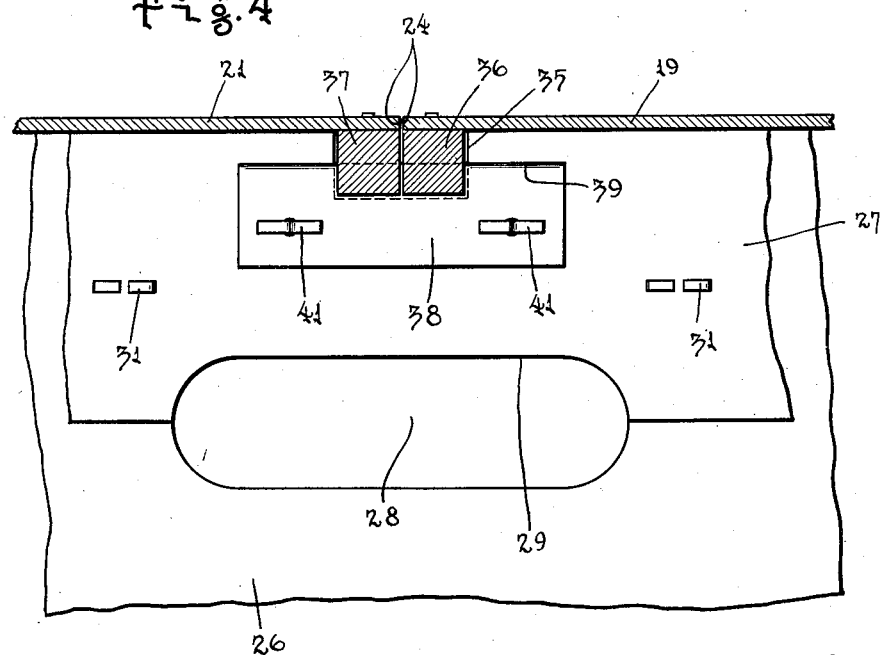

2,284,942

UNITED STATES PATENT OFFICE 2,284,942

BOX

Paul F. Boeye, St. Paul, Minn., assignor to Waldorf Paper Products Company, St. Paul, Minn., a corporation of Minnesota Application February 16, 1940, Serial No. 319,265

7 Claims. (Cl. 229—23)

My invention relates to boxes and has for an object to provide an extremely rigid and substantial construction capable of carrying bottles or similar heavy articles.

Another object of the invention resides in providing a box having a cover adapted to be frequently opened and reclosed.

A still further object of the invention resides in providing a box capable of sustaining appreciable weight applied on the cover thereof.

An object of the invention resides in constructing the cover with two flaps adapted to meet at the center of the box when in closed position and in constructing the flaps so that the same are extremely rigid throughout the meeting edges and along the center of the box.

A still further object of the invention resides in securing cleats to the meeting edges of the box and in supporting the cleats through the end walls of the box.

Another object of the invention resides in providing a box capable of being lifted by one end.

A feature of the invention resides in providing means for connecting one end of the box to the other through the cleats on the cover flaps.

Another object of the invention resides in preventing relative longitudinal movement between the cleats on the cover flaps.

A still further object of the invention resides in providing notches in the cleats and in further providing engaging members on the end walls adapted to engage within the notches of the cleats to restrain relative movement of the parts.

Another object of the invention resides in constructing the end walls with recesses for the reception of the ends of the cleats, and in disposing the engaging members at the locality of said notches.

Other objects of the invention reside in the novel combination and arrangement of parts and in the details of construction hereinafter illustrated and/or described.

In the drawings:

Fig. 1 is a perspective view of a box illustrating an embodiment of my invention and showing the cover flaps partly open.

Fig. 2 is an end elevational view of the box shown in Fig. 1 with the cover flaps closed.

Fig. 3 is a fragmentary elevational sectional view taken on line 3—3 of Fig. 2 and drawn to a larger scale.

Fig. 4 is a fragmentary elevational sectional view taken on line 4—4 of Fig. 3 and drawn to the same scale as Fig. 3.

Fig. 5 is a developed view of the blank from which the bottom, side walls, and cover flaps of the box are constructed.

Fig. 6 is a developed view of the blank from which the end walls of the box are constructed.

Fig. 7 is a fragmentary perspective view of a box illustrating a modification of the invention.

Fig. 8 is a view similar to Fig. 4 of the modification of the invention.

Fig. 9 is a fragmentary elevational sectional view taken on line 9—9 of Fig. 8.

Fig. 10 is a fragmentary developed view of the blank from which the bottom, side walls and cover flaps of the box shown in Fig. 7 are constructed.

My invention, as best shown in Fig. 1, is constructed from fibreboard or any other suitable material and is formed from a body blank A and two end blanks B. These blanks are shown in detail in Figs. 5 and 6 in developed form and will now be described.

The blank A consists of a single sheet of fibreboard of a width sufficiently greater than the length of the box to form end flaps on the various walls of the box and of a length sufficient to form a bottom, side walls and cover flaps for the box. This blank is formed with two longitudinal scores 10 and 11 and a number of transverse scores 12, 13, 14 and 15 which divide the blank into a bottom 16, side walls 17 and 18 and cover flaps 19 and 21. In addition, the said scores form at the ends of the side walls 17 and 18 and the bottom 16 end flanges 22. The various flanges 22 are separated by means of notches 23 situated at the ends of the scores 12, 13 and 14, and the cover flaps 19 and 21 are free from flanges. The flaps 19 and 21 are of such width that the free edges 24 thereof meet at the center of the box when the body blank A is folded up and formed into the box.

The end blank B is constructed of material similar to that used in the construction of the blank A which is of a width equal to the width of the box and of a height somewhat greater than the height of the box. This blank has formed in it a transverse score 25 which divides the blank into an end wall 26 and end wall flap 27. The end wall 26 has a hand hole 28 in it and the flap 27 has a cut away portion 29 adapted to register with the hand hole 28 when the said flap is folded into overlying position, as shown in Fig. 3.

In the erection of the box the flaps 27 of the blanks B are folded over and secured to the end walls 26 by means of staples or wire stitches 31. The blanks B are then assembled within the blank A with the side and bottom edges of these blanks adjacent the various flanges 22 of the blank A. The overlying said parts of the various blanks are then secured together through staples or wire stitches 32. In this manner the end walls 26 are rigidly attached to the bottom 16 and to the side walls 17 and 18 of the box.

The blank B has formed in it a rectangular opening 33 which is disposed medially of the lateral edges of the box and extends across the transverse scores 25. This opening is directly above the hand hole 28. When the flap 27 is folded back upon the end wall 26 the opening 33 forms a recess along the folded edge 34 of the end wall 26, which recess is indicated by the reference numeral 35. The recesses 35 are for the reception of the ends of two cleats 36 and 37 which are attached to the undersides of the flaps 19 and 21 of blank A at the meeting edges 24 thereof. These cleats are preferably constructed of wood and are rigidly attached to the cover flaps by gluing, stitching, nailing, or in any other suitable manner. The two cleats 36 and 37 extend through the recesses 35 when the cover flaps are in closed position and serve to partly support the cover flaps on the end walls of the box. The marginal end portion of the cover flaps 19 and 21 rest directly upon the edges 34 of the end walls 26 and the cover of the box is thus additionally supported.

Overlying the inner surfaces of the end wall flaps 27 and extending across the lowermost portions of the recesses 35 are engaging members 38. These members may be constructed from a single bar of metal or the same may be constructed as shown in the drawings from sheet metal doubled over to form an upwardly exposed rounded edge 39. The engaging members 38 are secured to the end walls 26 by means of rivets 41 which extend jointly through the said engaging members, the flaps 27 and the end walls 26. The portions of the said engaging members projecting into the recesses 35 are adapted to be received within notches 42 formed across the undersides of the cleats 36 and 37. The engaging members 38 fit snugly within the said notches and when the cover members are closed restrain relative movement therebetween. In addition, the cleats form a tie between the end walls of the box permitting the box to be picked up by either end wall upon insertion of the fingers through the hand holes 28 therein.

In Figs. 7 to 10 inclusive, I have shown a modification of the invention utilizing a different form of engaging member. Inasmuch as the construction of the box is quite similar to that previously described the description of the corresponding parts will not be repeated and the same reference numerals preceded by the digit 1 will be used to designate corresponding parts.

In the contruction shown in Figs. 7 to 10 the cleats 136 and 137 are formed with notches 142 which extend along the oppositely facing vertical edges of the cleats when the cover flaps are in closing position. The engaging member 143 in this form of the invention consists of a piece of wire which is bent to form a U-shaped structure 144 having a base 145 and two uprights 146 and extending upwardly therefrom. These uprights have issuing from them arms 147 which terminate in eyes 148. The engaging member 143 is adapted to be inserted between the end wall 126 and the end wall flap 127 and is held in position by means of two rivets 149 which extend through the eyes 148 and through the end wall 126 and end wall flap 127. The engaging member 143 is so constructed that the two uprights 146 project inwardly into the recesses 135 along the vertical edges thereof and so that the base 144 lies flush with the lowermost edges of the said recess. The uprights 146 of the engaging member 143 are adapted to enter the notches 142 in the cleats 136 and 137 and serve to restrain relative longitudinal movement of the said cleats 136 and 137 when the cover flaps are in closing position.

The use of the invention is obvious. After the contents have been placed in the box, the cover flaps are closed and the engaging member 38 of the box, shown in Fig. 1, caused to enter the notches 42 of the cleats 36 and 37. This holds the parts from relative endwise movement and permits of carrying the box by engagement of one of the end walls through the hand hole 28 therein. In the form of the invention shown in Fig. 7 cover flaps 119 and 121 are similarly closed and the uprights 146 of the engaging member 143 brought into engagement with the notches 142 of the cleats 136 and 137. When the box is to be opened the cover flaps can be engaged at the exposed end edges thereof and the cleats 136 and 137 at their exposed ends, both said cover flaps and cleats being made slightly longer than the outer length of the box so as to be readily engageable and thus easily manipulated.

The advantages of my invention are manifest. My box can be constructed at an economical cost. By the use of the wood cleats great rigidity is procured and the meeting edges of the cover flaps prevented from fraying. By means of the construction shown in Fig. 7 the cleats are held from spreading as well as from endwise movement through the engaging members. With my construction sufficient friction can be had between the engaging member and the notches in the cleats so as to hold the cover flaps yieldingly in closing position.

Changes in the specific form of my invention, as herein disclosed, may be made within the scope of what is claimed without departing from the spirit of my invention.

Having described my invention, what I claim as new and desire to protect by Letters Patent is:

I claim:

1. A box open at the top comprising side and end walls and a bottom connected therewith, a cover for the box comprising flaps hinged to two opposite walls of the box and extending substantially in a common plane when in closing position to effect a closure for the box, cleats secured to said cover flaps upon the under sides thereof and situated at the meeting edges of said cover flaps, the other walls of the box having recesses formed therein for the reception of the ends of the cleats, said cleats having transversely extending grooves therein at the locality of said recesses, and means attached to said second named walls at the locality of said recesses and having transversely extending portions for engagement with said grooves to restrain movement of the cleats with respect to the walls of the box and with respect to one another in the direction of their length.

2. A box open at the top comprising side and end walls and a bottom connected therewith, a cover for the box comprising flaps hinged to two opposite walls of the box and extending substantially in a common plane when in closing position to effect a closure for the box, cleats secured to said cover flaps upon the under sides thereof and situated at the meeting edges of said cover flaps, the other walls of the box having recesses formed therein for the reception of the ends of the cleats, engaging members attached to the second named walls of the box at the localities of the recesses therein, said engaging members having transverse portions projecting into the recesses and lying in planes parallel to the walls of the box to which the engaging members are attached and grooves formed in said cleats and extending transversely of the length thereof for the reception of the projecting portions of said engaging members.

3. A box open at the top comprising side and end walls and a bottom connected therewith, a cover for the box comprising flaps hinged to two opposite walls of the box and extending substantially in a common plane when in closing position to effect a closure for the box, cleats secured to said cover flaps upon the under sides thereof and situated at the meeting edges of said cover flaps, the other walls of the box having recesses formed therein for the reception of the ends of the cleats, a bar secured to each of the second named walls at the locality of the recesses therein and having a portion projecting upwardly into said recesses, said cleats being formed with transverse notches upon the under sides thereof adapted to receive the projecting portions of said bars.

4. A box open at the top comprising side and end walls and a bottom connected therewith, a cover for the box comprising flaps hinged to two opposite walls of the box and extending substantially in a common plane when in closing position to effect a closure for the box, cleats secured to said cover flaps upon the under sides thereof and situated at the meeting edges of said cover flaps, the other walls of the box having recesses formed therein for the reception of the ends of the cleats, and a U-shaped engaging member attached to each of said second named walls and disposed at the locality of the recess therein, said engaging members having uprights adapted to enter into said recesses along the lateral edges thereof, and notches formed in the oppositely facing vertical edges of said cleats for the reception of the uprights of said engaging members.

5. A box open at the top comprising side and end walls and a bottom connected therewith, a cover for the box comprising flaps hinged to two opposite walls of the box and extending substantially in a common plane when in closing position to effect a closure for the box, cleats secured to said cover flaps upon the under sides thereof and situated at the meeting edges of said cover flaps, the other walls of the box having recesses formed therein for the reception of the ends of the cleats, and a U-shaped engaging member attached to each of said second named walls and disposed at the locality of the recess therein, said engaging members having uprights adapted to enter into said recesses along the lateral edges thereof, and notches formed in the oppositely facing vertical edges of said cleats for the reception of the uprights of said engaging members, said engaging members having arms issuing from the upper ends of the uprights, eyes formed at the ends of said arms and rivets extending through the second named walls of the box and through said eyes for attaching the engaging member thereto.

6. A box open at the top comprising side and end walls and a bottom connected therewith, a cover for the box comprising flaps hinged to two opposite walls of the box and extending substantially in a common plane when in closing position to effect a closure for the box, cleats secured to said cover flaps upon the under sides thereof, said other walls having flaps bent downwardly from the upper edges thereof and secured thereto, said second named walls having recesses extending through the upper portions thereof and through said flaps for the reception of the ends of said cleats, and U-shaped engaging members disposed between said second named walls and the flaps thereof, said engaging members being disposed at the localities of the recesses therein, said engaging members having uprights adapted to enter into said recesses along the lateral edges thereof, and notches formed in the oppositely facing vertical edges of said cleats for the reception of the uprights of said engaging members.

7. A box open at the top comprising side and end walls and a bottom connected therewith, a cover for the box comprising flaps hinged to two opposite walls of the box and extending substantially in a common plane when in closing position to effect a closure for the box, cleats secured to said cover flaps upon the under sides thereof and situated at the meeting edges of said cover flaps, the other walls of the box having recesses formed therein for the reception of the ends of the cleats, engaging members attached to the second named walls of the box at the localities of the recesses therein, said engaging members having portions projecting into the recesses and lying in planes parallel to the walls of the box to which the engaging members are attached and grooves formed in said cleats and extending transversely of the length thereof for the reception of the projecting portions of said engaging members, said grooves forming facing shoulders for engagement with said engaging members, said shoulders restraining relative movement between said cleats in the direction of their length.

PAUL F. BOEYE.